Oct. 30, 1934.　　H. S. BLUMBERG ET AL　　1,978,891
METHOD OF ELECTRICAL RESISTANCE FLASH WELDING
Filed Oct. 20, 1932
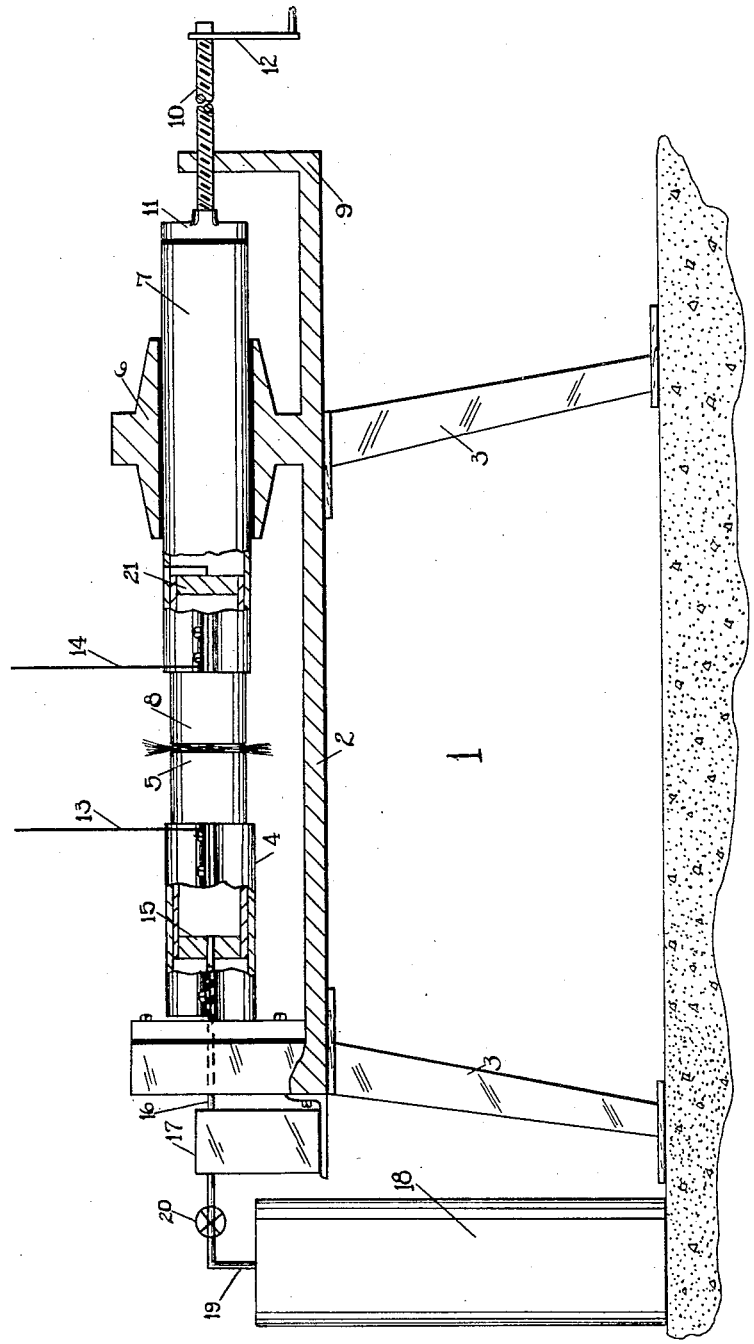
INVENTORS
Harry S. Blumberg, and
Robert W. Waring
BY Virgil F. Davis
ATTORNEY Patented Oct. 30, 1934

1,978,891

UNITED STATES PATENT OFFICE 1,978,891

METHOD OF ELECTRICAL RESISTANCE FLASH WELDING

Harry S. Blumberg, Englewood, N. J., and Robert W. Waring, Evanston, Ill., assignors to M. W. Kellogg Co., New York, N. Y., a corporation of Delaware Application October 20, 1932, Serial No. 638,684

3 Claims. (Cl. 219—10)

This invention relates in general to resistance flash welding and in particular to a method of electrical resistance flash welding by means of which the characteristics of the metal at the weld are controlled and weak and imperfect welds prevented.

Electrical resistance flash welding as at present practised, generally comprises connecting the parts to be welded to a current source, bringing the parts together to close the current circuit, separating the parts to establish an arc or arcs, moving the parts towards each other to maintain the arc or arcs, and when sufficient metal of the parts has been heated to the proper temperature forcing the parts together under sufficient pressure to weld them into a unitary structure, the current supply being interrupted before or after the parts are brought together to unite them. The arc or arcs as they play between the parts consume some of the metal thereof and cause eruptions of sparks of varying intensity which are accompanied by considerable noise. The variation in intensity of these eruptions is probably due to the varying characteristics of the current path between the parts. During irregular intervals explosions occur which are accompanied by the projection of considerable metal from the parts. These explosions, are probably due, in addition to the varying characteristics of the current path, to the oxidation of segregated oxidizable material.

Examination of a large number of welds made in accordance with the procedure outlined above, conclusively shows that the explosions mentioned seriously weaken the weld, the weakening effect of the explosions being most apparent in welds formed by uniting the parts at the time of or shortly after an explosion. The last mentioned welds usually break in the line of the weld when tested and the fracture faces show areas of varying size which indicate improper union between the metal of the parts. Since it is not possible to predict the time of occurrence of the explosions mentioned it is not possible to eliminate their effect by variation of the procedure above mentioned in accordance with the present knowledge of the art.

Examination has also revealed the fact that the composition of the weld metal is usually different from the metal of the parts, for instance, when the parts are made of high carbon content steel, the weld metal will have a materially reduced carbon content. This is a serious disadvantage especially when the parts are made of a metal of a particular composition because of its strength, corrosion resistance, and other properties.

Our invention contemplates a method of electrical flash resistance welding of general application which has none of the disadvantages of the electrical flash resistance welding methods at present known to the art and by means of which the composition of the metal at the weld may be controlled.

In accordance with our invention, we pass a current of dry gas through the gap between the parts to be welded at a pressure insufficient to interfere with the arc or arcs playing therein, but yet sufficient to penetrate the arc or arcs and exclude the air from the arc or arcs and the metal defining the gap. Thus oxidation of the metal defining the gap and the metal in the arc or arcs is prevented and at the same time the gas in and around the arc or arcs is ionized to afford a path of substantially constant resistance for the passage of the current. The resistance of the ionized current path is materially less than the resistance of the current path offered in the known processes with the result that lower voltages may be used. The effect of the ionized current path and reduced voltage is very marked as the arc or arcs are steadier and the spark eruptions and the noise accompanying them materially reduced.

As just stated, the dry gas is passed through the gap between the parts to be welded primarily in order that an ionized path be offered to the current and that the metal at high temperature be protected from the air. However, we have found that by using the proper dry gas or dry gas mixtures, we may attain other very valuable results. Thus by using an inert gas, or a gas or mixtures of gases which do not react with the components of the metal of the parts to be welded, we are able to produce a weld the weld metal of which is identical in composition with the metal of the parts. By using a gas or mixtures of gases which react with certain of the components of the metal of the parts to be welded to produce volatile products, we are able to produce a weld the weld metal of which lacks or has a smaller proportion of said certain components. Also, by using a gas or mixture of gases having components which are absorbed by the metal of the parts, we are able to add components to the metal of the weld.

Other objects and advantages of the invention will become apparent from a consideration of the following description of a specific application of the invention taken together with the drawing in which the single figure represents in a diagrammatic manner the apparatus used in connection with the method of this invention.

Referring to the drawing:

Machine 1 includes a support 2 mounted on legs 3. At one end of support 2 is fixed a clamping member 4 in which is adapted to be positioned one part 5 of the parts to be welded. Clamping member 4 is suitably insulated from support 2. At the other end of support 2 is a bearing member 6 in which clamping member 7 is axially movable. Clamping member 7 is suitably insulated from bearing member 6 and is adapted to have positioned therein the other part 8 of the parts to be welded. From the end of support 2 at which bearing member 6 is located extends a bracket 9 having a threaded hole therein through which passes screw 10. One end of screw 10 is mounted for rotation in a socket provided in plate 11, the arrangement being such that plate 11 and clamping member 7 to which it is connected will follow the axial movements of screw 10. Plate 11 is suitably insulated from clamping member 7. The other end of screw 10 has fastened thereto a handle 12 by means of which screw 10 may be rotated to move clamping member 7 towards or away from clamping member 4.

A cable 13 is connected to clamping member 4 and a cable 14 is connected to clamping member 7. Cables 13 and 14 are connected to a current source (not shown) and serve to lead the welding current to parts 5 and 8. The end of part 5 in clamping member 4 is closed by a plug 15 through which passes a pipe 16. Pipe 16 connects to a gas dryer 17 which may be of any known construction. Dryer 17 is connected to gas reservoir 18 by a pipe 19 which is controlled by a valve 20. The end of part 8 in clamping member 7 is closed by a plug 21.

To carry out the method of this invention parts 5 and 8, after having plugs 15 and 21 inserted therein are aligned and clamped in their respective clamping member 4 and 7. Screw 10 is then rotated to bring parts 5 and 8 into contact, the current circuit closed, and valve 20 opened to allow dry gas to pass from reservoir 18 into parts 5 and 8. Screw 10 is then rotated to separate parts 5 and 8 to strike an arc or arcs therebetween and valve 20 manipulated until the dry gas flows through the gap between parts 5 and 8 at the proper pressure to penetrate the arc or arcs and yet not interfere therewith. The attainment of this condition is evidenced by a decrease in the resistance of the arc or arcs and a quieting and steadying thereof, also the amount of sparking perceptibly diminishes. As the metal of parts 5 and 8 is consumed screw 10 is rotated to maintain the width of the gap between parts 5 and 8 substantially constant. The arc or arcs do not maintain a fixed position in the gap but continuously move back and forth therein to substantially uniformly heat the metal defining the gap. When the proper amount of metal has been brought to the welding temperature, parts 5 and 8 are again brought together and pressure exerted to upset the heated metal and intimately weld parts 5 and 8. The current circuit is again opened and valve 20 closed.

During the time that the arc or arcs are playing in the gap between parts 5 and 8 the number and intensity of the explosions are materially reduced over these occurring in previous methods. This, as well as the novel results already mentioned is due to the fact that the dry gas in passing through the gap and the arcs playing therein offers an ionized path of substantially constant resistance to the passage of the current and protects the metal in the arc and in the sides of the gap from the atmosphere. Because of the ionized current path and lower voltage of the arc, the arc is steadier and more quiet. Also because of the reduced number of explosions and sparking the metal of the parts is consumed more evenly, that is, the metal is consumed without pitting the sides of the gap and the trapping of gas, oxides, etc. which usually occurs when the sides of the gap pit is avoided. Examination of a large number of welds produced in accordance with the method just disclosed, shows a marked uniformity of the weld metal along the full length of the weld and a substantially entire absence of weak or improperly united areas.

By properly choosing the gas supplied by reservoir 18 we are able to produce additional advantageous results. Thus by using helium or another gas or mixture of gases which does not react with the components of the metal of parts 5 and 8, we can produce welds the weld metal of which is of the same composition as the metal of parts 5 and 8. By using a gas or a mixture of gases that reacts with one or more of the components of the metal of parts 5 and 8, to form volatile products which are not present in the cooled weld metal, we can produce welds the metal of which contains a lesser amount of a desired component or said component is entirely lacking, for instance by using hydrogen when the parts 5 and 8 are of steel or other carbon containing ferrous metal we can reduce or entirely eliminate the carbon in the weld metal. By using a gas or a mixture of gases that react with the metal of parts 5 and 8 to form compounds which remain in the cooled weld metal or contain components which are absorbed by the weld metal, we can produce welds which contain components not present in the metal of parts 5 and 8 or contain different percentage of one or more of the components of the metal of parts 5 and 8, for instance, by using a hydrocarbon gas such as acetylene or a gas mixture such as city gas when the parts 5 and 8 are of steel of other carbon containing ferrous metal, we can increase or decrease the carbon content of the weld metal.

By using a dry gas or mixtures of dry gases we eliminate all possible effects of moisture at the arc and are assured of attaining the desired results.

Although we have chosen to disclose our invention in connection with the butt-welding of tubular parts, it should be obvious that it is applicable to all types of resistance flash welding.

We claim:

1. The method of electric welding and controlling the composition of the metal of the weld, which comprises connecting the parts to be welded to a current source, bringing said parts into contact, separating said parts to establish a heating arc therebetween, maintaining said heating arc, passing through the gap between the contiguous edges of said parts a current of nonoxidizing gas having constituents adapted to react with certain of the components of the metal of said parts, controlling the pressure of said gas current to insure penetration of the arc without substantial interference therewith, and applying pressure to weld said parts together.

2. The method of electric welding and controlling the composition of the metal of the weld, which comprises connecting the parts to be welded to a current source, bringing said parts into contact, separating said parts to establish a heating arc therebetween, moving said parts towards each other to maintain said heating arc, passing through the gap between the contiguous edges of said parts a current of hydro-carbon gas of the composition required to carry out a predetermined reaction with the metal of said parts, controlling the pressure of said gas current to insure penetration of the arc without substantial interference therewith, and applying pressure to weld said parts together.

3. The method of electric welding and controlling the composition metal of the weld, which comprises connecting the parts to be welded to a current source, bringing said parts into contact, separating said parts to establish a heating arc therebetween, moving said parts towards each other to maintain said heating arc, passing through the gap between the contiguous edges of said parts a current of city gas, controlling the pressure of said gas current to insure penetration of the arc without substantially interfering therewith, and applying pressure to weld said parts together.

HARRY S. BLUMBERG.
ROBERT W. WARING.